United States Patent
Sood et al.

(10) Patent No.: US 9,749,676 B2
(45) Date of Patent: Aug. 29, 2017

(54) VIRTUAL PLAYBACK SPEED MODIFICATION

(75) Inventors: Vishal Sood, Bothell, WA (US); Raymond Cheng, Sammamish, WA (US); Anirban Roy, Kirkland, WA (US); Jack E. Freelander, Monroe, WA (US); Sudheer Sirivara, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 750 days.

(21) Appl. No.: 12/795,672

(22) Filed: Jun. 8, 2010

(65) Prior Publication Data

US 2011/0302238 A1    Dec. 8, 2011

(51) Int. Cl.

| | |
|---|---|
| G06F 15/16 | (2006.01) |
| H04N 21/432 | (2011.01) |
| G11B 27/00 | (2006.01) |
| H04L 29/06 | (2006.01) |
| H04N 21/2343 | (2011.01) |
| H04N 21/6587 | (2011.01) |

(52) U.S. Cl.
CPC ....... *H04N 21/4325* (2013.01); *G11B 27/005* (2013.01); *H04L 29/06027* (2013.01); *H04N 21/2343* (2013.01); *H04N 21/6587* (2013.01)

(58) Field of Classification Search
CPC .............. H04N 5/783; H04L 21/4325; H04L 29/06027
USPC ................................ 709/203, 245, 200, 224
See application file for complete search history.

(56) References Cited

U.S. PATENT DOCUMENTS

| | | | | |
|---|---|---|---|---|
| 6,356,708 | B1 * | 3/2002 | Krause et al. | 386/329 |
| 6,658,199 | B1 * | 12/2003 | Hallberg | 386/346 |
| 6,980,594 | B2 * | 12/2005 | Wang et al. | 375/240.12 |
| 7,480,447 | B2 * | 1/2009 | Schultz et al. | 386/343 |
| 7,596,300 | B2 * | 9/2009 | Iwamura | 386/343 |
| 2005/0262529 | A1 * | 11/2005 | Neogi et al. | 725/31 |

(Continued)

OTHER PUBLICATIONS

Sood, Vishal., "IIS Smooth Streaming Player Development Kit Beta 2 Released", Retrieved at << http://blogs.iis.net/vsood/archive/2010/01/15/iis-smooth-streaming-player-development-kit-beta-2-released.aspx >>, Jan. 15, 2010, pp. 5.

(Continued)

*Primary Examiner* — El Hadji Sall
(74) *Attorney, Agent, or Firm* — Fiala & Weaver P.L.L.C.

(57) ABSTRACT

A multispeed playback system is described herein that allows for playback of smooth streaming media presentations at speeds other than the normal speed or direction, while still using an underlying platform that does not natively support multispeed. The system provides frames to the underlying platform so that the platform is still playing 1× content while the system manipulates video and/or audio samples being fed to the platform to make rendered data look appropriately for a selected speed and direction. The system may feed the underlying platform frames at a faster rate or skip every other frame for faster playback, or may feed each frame to the underlying platform multiple times for slower playback. Thus, the multispeed playback system allows a client application developer to provide users with expected multispeed playback at the client without encoding multiple different streams at the server.

20 Claims, 4 Drawing Sheets (56) References Cited

U.S. PATENT DOCUMENTS

| | | | |
|---|---|---|---|
| 2005/0271353 A1* | 12/2005 | Kelly et al. .................... | 386/46 |
| 2006/0085835 A1* | 4/2006 | Istvan et al. .................. | 725/119 |
| 2007/0036519 A1* | 2/2007 | White ................... | G11B 27/10 |
| | | | 386/234 |
| 2008/0148327 A1* | 6/2008 | Xu ............................... | 725/105 |
| 2008/0212775 A1* | 9/2008 | Mirsky et al. ................ | 380/210 |
| 2009/0049186 A1* | 2/2009 | Agnihotri .......... | H04N 7/17336 |
| | | | 709/231 |
| 2009/0083816 A1* | 3/2009 | St. John-Larkin ............ | 725/114 |
| 2009/0097819 A1* | 4/2009 | Dui et al. ........................ | 386/68 |
| 2009/0158326 A1* | 6/2009 | Hunt et al. ..................... | 725/38 |

OTHER PUBLICATIONS

Raj, et al., "Server Side Trick Play for Video Streaming", Retrieved at << http://ieeexplore.ieee.org/stamp/stamp.jsp?arnumber=05202611 >>, IEEE International Conference on Multimedia and Expo, ICME 2009, Jun. 28-Jul. 3, 2009, pp. 782-785.

* cited by examiner

VIRTUAL PLAYBACK SPEED MODIFICATION

BACKGROUND

Streaming media is multimedia that is constantly received by, and normally presented to, an end-user (using a client) while it is being delivered by a streaming provider (using a server). Several protocols exist for streaming media, including MICROSOFT™ Internet Information Server (IIS) Smooth Streaming (referred to as smooth streaming herein). Prior to smooth streaming, most streaming media technologies used tight coupling between server and client with a stateful connection. The stateful connection between client and server created additional server overhead, because the server tracked a current state of each client, and limited the scalability of the server.

Smooth streaming provides stateless communication between the client and server by breaking media up into chunks that are individually addressable and can be individually requested by clients. For a particular media event or content item, the smooth streaming server provides a manifest file that describes each of the chunks that comprise the event. For example, a one-minute video provided by smooth streaming may include 60 one-second audiovisual chunks. Each chunk contains metadata and media content. The metadata may describe useful information about the media content, such as the bit rate of the media content, where the media content fits into a larger media element, a codec used to encode the media content, and so forth. The client uses this information to place the chunk into a storyboard of the larger media element and to properly decode and playback the media content. The chunks can be in any format, such as Motion Picture Experts Group (MPEG) 4 boxes or other containers. A smooth streaming client plays a media event to a user by reading the manifest and regularly requesting chunks from the server. The user may also skip around (e.g., seek, fast forward, rewind) and the client can provide these behaviors by requesting later or earlier chunks described by the manifest. For live events, the server may provide the manifest to the client piecemeal, so that the server informs the client of newly available chunks as they become available.

Each chunk may have its own Uniform Resource Locator (URL), allowing chunks to be cacheable by existing Internet infrastructure. The Internet contains many types of downloadable media content items, including audio, video, documents, and so forth. These content items are often very large, such as video in the hundreds of megabytes. Users often retrieve documents over the Internet using Hypertext Transfer Protocol (HTTP) through a web browser. The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

Users often want to fast forward (at various speeds), rewind (at various speeds), or view a media presentation in slow motion. However, smooth streaming is built on the MICROSOFT™ SILVERLIGHT™ MediaElement user interface control, which does not natively support any multi-speed capabilities other than normal playback. Without the ability to alter speed, users are stuck identifying the content they want to view by seeking around until they find the right place in the presentation.

SUMMARY

A multispeed playback system is described herein that allows for playback of smooth streaming media presentations at speeds other than the normal speed or direction, while still using an underlying platform that does not natively support multispeed. The system provides frames to the underlying platform so that the platform is still playing 1× content while the system manipulates video and/or audio samples being fed to the platform to make rendered data look appropriately for a selected speed and direction. If the user requests fast forwarding, then the system may feed the underlying platform frames at a faster rate or skip every other frame. If the user requests slower playback, then the system may feed each frame to the underlying platform slower. In addition, the multispeed playback system can use advanced support on a smooth streaming server to make content delivery more efficient for these scenarios by requesting fewer frames or smaller fragments. Thus, the multispeed playback system allows a client application developer that uses smooth streaming to provide users with expected multispeed playback at the client without encoding multiple different streams at the server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A multispeed playback system is described herein that allows for playback of smooth streaming media presentations at speeds other than the normal speed or direction, while still using an underlying platform that does not natively support multispeed. In some embodiments, the system relies on an underlying platform such as MICROSOFT™ SILVERLIGHT™ for decoding and playback of compressed media content. The system uses methods to make the SILVERLIGHT™ runtime believe that is still playing 1× content while the system manipulates video and/or audio samples being fed to the pipeline to make rendered data look appropriately for a selected speed. For example, if the user requests fast forwarding or 2× playback, then the system may feed the underlying platform frames at a faster rate or skip every other frame. If the user requests slower playback, then the system may feed each frame to the underlying platform slower or use other techniques for slower playback. In addition, the multispeed playback system can use advanced support on a smooth streaming server to make content delivery more efficient for these scenarios.

In some embodiments, the system also uses additional techniques described herein to make audio playback sound reasonable when video is being played at a non-standard speed. The underlying platform may expect to continuously be fed audio data, which can be problematic when a sped up or slowed down audio feed is not available. Although video can be manipulated frame by frame in a manner that produces a consistent display, audio data often cannot. In some cases, the system may feed silent audio into the platform runtime when video is playing at a non-standard speed. Thus, the system allows a client application developer that uses smooth streaming to provide users with expected multispeed playback at the client without encoding multiple different streams (e.g., a fast forward or 2x stream) at the server. With the well-defined requests and responses of smooth streaming media and the cacheable chunks, it is useful to be able to reuse the responses that are already available to produce multispeed playback (rather than creating another stream at the server for the same purpose).

In some embodiments, smooth streaming uses a particular data transmission format between the server and client. The client requests fragments of media from a server that include a portion of the media. For example, for a 10-minute file, the client may request 2-second or smaller fragments. Note that unlike typical streaming where the server pushes data to the client, in this case the client pulls media fragments from the server. In the case of a live stream, the server may be creating the media on the fly and producing fragments to respond to client requests. Thus, the client may only be several fragments behind the server in terms of how fast the server creates fragments and how fast the client requests fragments.

Each fragment contains metadata and media content. The metadata may describe useful information about the media content, such as the bit rate at which the media content was encoded, where the media content fits into a larger media element (e.g., this fragment represents offset 1:10 in a 10 minute video clip), the codec used to encode the media content, and so forth. The client uses this information to place the fragment into a storyboard of the larger media element and to properly decode and playback the media content.

Network packet loss is inevitable. It happens on the public Internet, DSL, Cable, wireless local area network (WLAN), 3G wireless, and many other kinds of networks. The estimated packet loss rate on the Internet is 5%, and some wireless networks may have packet loss of over 10%. Reliable network transmission protocols, such as Transmission Control Protocol (TCP), will resend a packet if the transmission medium drops the packet, thus guaranteeing packet delivery. Unreliable protocols, such as Unreliable Datagram Protocol (UDP), do not guarantee packet delivery and do not resend dropped packets. Resending packets takes time and consumes additional bandwidth. Due to the real-time nature of video communication, video signals are often sent using unreliable protocols and therefore will suffer from network packet loss.

For real-time video communication, a sending endpoint sends video frames across a network to a receiving endpoint, sometimes at a rate of 20 to 30 frames per second or more. Frames are divided into packets based on the Maximum Transmission Unit (MTU) allowed by the network (e.g., 1500 bytes for Ethernet). A frame of video may be small enough to fit within one packet, or may be large enough to fill many packets. For some video compressor/decompressors (codecs), if any of the packets in a frame is dropped, then the receiving endpoint may discard the whole frame due to missing data.

In addition, codecs often use a dependency structure to reduce the amount of video data that a sending endpoint transmits over the network. For example, a frame called an intra (I) frame is encoded in full based on its contents. Subsequent frames are compressed based on a delta (difference signal) from the previous frames. These frames are often called prediction (P) frames. Some codecs introduce even more complex dependency structures. For example, the codec may occasionally send designated P frames called super-prediction (SP) frames that, as opposed to regular P-frames, do not depend on the immediately preceding P-frame or I-frame but rather on an older SP-frame or I-frame. The content of such SP-frames typically is less correlated with the reference frame, and thus carries more video data. Another type of frame is a between or bi-directional (B) frame that contains a delta from both a previous and a subsequent frame. These types of inter-frame dependencies reduce the amount of data that the sending endpoint transmits over the network, but the dependencies also exaggerate the effects of network packet loss. For example, if an I-frame is dropped, the receiving endpoint will be missing data for all subsequent P-frames that depend on the I-frame, and the user will see video artifacts until the next I-frame arrives.

A group of pictures (GOP) structure specifies the order in which intra- and inter-frames are arranged. A GOP is a group of successive pictures within a coded video stream. Each coded video stream comprises successive GOPs. From the pictures contained in the GOP, the visible frames are generated. A GOP begins with an I-frame. Afterwards several P-frames follow, in each case with some frame distance. In the remaining gaps are B-frames. The I-frames contain the full image and do not reference any additional information to reconstruct the picture. Therefore, any errors within the GOP structure are corrected by the next I-frame. B-frames within a GOP only propagate errors in H.264, where other pictures can reference B-frames in order to increase compression efficiency. The more I-frames the video stream has, the more editable it is. However, having more I-frames increases the stream size. In order to save bandwidth and disk space, videos prepared for internet broadcast often have only one I-frame per GOP. The GOP structure is often referred by two numbers, for example M=3, N=12. The first one tells the distance between two anchor frames (I or P). The second one tells the distance between two full images (I-frames): it is the GOP length. For the example M=3 N=12, the GOP structure is IBBPBBPBBPBB. Instead of the M parameter, one can use the maximal count of B-frames between two consecutive anchor frames.

In some embodiments, the multispeed playback system converts all non-standard (e.g., not 1x) playback timelines into a 1x forward timeline which, when rendered by the pipeline, looks like the video is moving forward or backward through the clip at the selected speed, but appears to the platform like normal 1x forward playback. The system also converts from the 1x timeline back to the non-standard timeline in order to properly advance the current position. To get around the lack of pipeline reconfiguration, the system dynamically generates silent audio packets to feed to the audio pipeline. At some speeds, there are extraneous frames that do not need to be downloaded from the server. For example, at a fast rate of playback the client may be able to only play I-frames to produce smooth, sped up video. In some embodiments, the server includes a request type that returns just the first I-frame of a video chunk (e.g., typically 2 seconds in length). The request may use a modified URL similar to that used by normal smooth streaming chunk requests, but that adds a parameter or virtual directory to indicate that only I-frames are requested.

In some embodiments, the multispeed playback system includes modifications to download heuristics that allow selecting appropriate video quality levels depending on the selected playback speed. For example, the system may model key frame size as a fixed ratio of full chunk size, estimate expected frame rate as a function of playback rate, keep history and downloaded chunks when the new playback rate is similar enough to the old playback rate to allow, and scale buffering levels by playback rate. These modifications allow multiple playback speed without unnecessary increases in download bandwidth while maintaining smooth playback.

Figure 1:
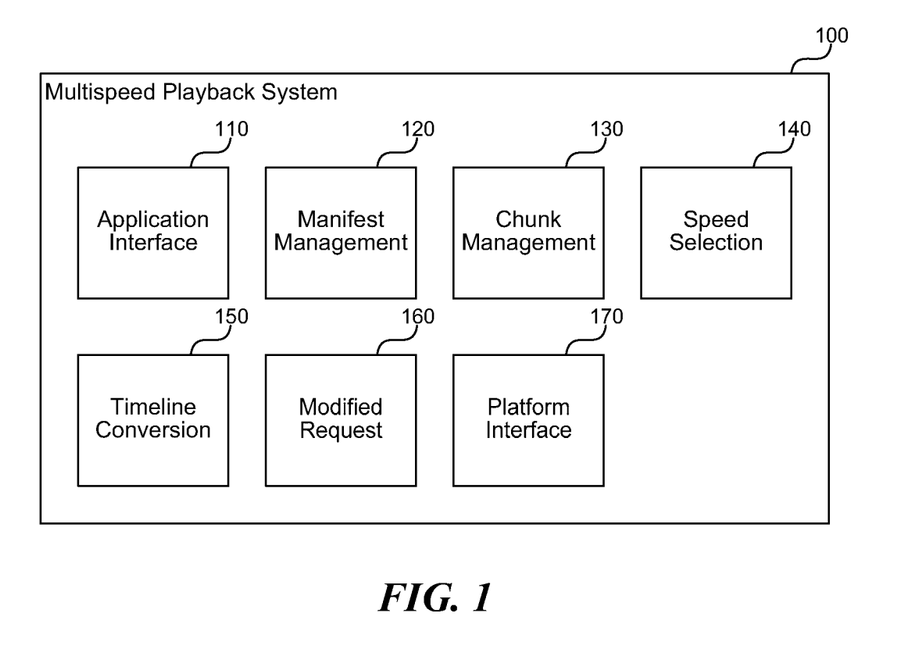
FIG. 1 is a block diagram that illustrates components of the multispeed playback system, in one embodiment.

FIG. 1 is a block diagram that illustrates components of the multispeed playback system, in one embodiment. The system 100 includes an application interface component 110, a manifest management component 120, a chunk management component 130, a speed selection component 140, a timeline conversion component 150, a modified request component 160, and a platform interface component 170. Each of these components is described in further detail herein.

The application interface component 110 provides an interface to client applications through which the applications can playback smooth streaming media. For example, a SmoothStreamingMediaElement (SSME) interface provided by the IIS Smooth Streaming Client implements one application interface through which applications can select tracks, play smooth streaming media, control playback (e.g., pause, skip), insert advertisements, and so forth. The application interface component 110 may provide a variety of functions that can be called by applications using a variety of programming languages and platforms. For example, the SSME interface in one embodiment uses MICROSOFT-™.NET and can interact with .NET languages (e.g., C#, VB.NET, and so on). The SSME interface may closely resemble the SILVERLIGHT™ MediaElement interface with additional methods and properties specific to smooth streaming to increase developer familiarity with the interface.

The manifest management component 120 downloads manifest information from a smooth streaming server that describes smooth streaming media to be played by the system 100. A manifest may include an extensible markup language (XML) file or other format that describes one or more available tracks, quality levels available (e.g., based on video bitrate or audio encoding format), and chunk timestamps of chunks that make up the content. Each chunk may include an HTTP cacheable portion of the media, retrievable at a specified URL. The chunk may include a frame, MPEG Group of Pictures (GOP), particular number of seconds, or other appropriate subdivision of content for transmission in parts from a server to a client. In some embodiments, the manifest management component 120 handles manifest updates for live events during which a smooth streaming server provides updates as the event progresses so that the client can build a manifest and find out about new chunks that are available.

The chunk management component 130 retrieves one or more chunks associated with smooth streaming media and prepares the chunks for playback by an underlying platform. For example, the chunk management component 130 may identify chunks in the manifest and periodically issue requests to retrieve new chunks from a server. Upon receipt of each chunk, the component 130 places the chunks in a playback queue. The component 130 may also unbox the received chunks to extract metadata and content as well as providing any decoding to place the content in a format that the underlying platform can playback. In some cases, the underlying platform may provide one or more codecs associated with the content so that the chunk management component 130 extracts the content from an on-the-wire format and provides it to the platform layer for decoding and playback.

The speed selection component 140 receives requests to modify playback speed of smooth streaming media. For example, a user may click a fast forward or rewind button in a displayed user interface, and a client application may communicate the user request to change the speed through the application interface component 110. The speed selection component 140 may receive specific enumerated speeds or an integer, floating point, or other number that represents a factor of increase (e.g., 2×) or decrease (e.g., ½) in the speed. The speed selection component 140 invokes the timeline conversion component 150 to modify the playback timeline to create the effect expected for the selected speed.

The timeline conversion component 150 manages both an original timeline of the smooth streaming media and a platform timeline that represents currently playing media, and converts between the two timelines to produce modified playback speeds. For example, if the user requests to play video at twice a normal playback speed, then the component 150 determines an appropriate conversion to produce faster playback of the displayed video. The smooth streaming media timeline is fixed, and to play the media twice as fast, the system has to provide the platform with frames for its timeline that will produce the desired effect. For faster video, the system can drop frames from the smooth streaming timeline and place the remaining frames in the platform timeline. The result is video that appears to play faster to the user. Depending on the amount of speed up, the timeline conversion component 150 drops an appropriate number of frames. For example, for 2× video, the component 150 drops every other frame. Timeline conversion helps the developer to still keep track of the video timelines.

For slowed down video, the system may repeat frames or feed them to the playback layer slower. In some cases, the underlying platform expects a timestamp to accompany each frame so that the platform can play the frame at an appropriate time. The timeline conversion component 150 modifies timestamps of frames submitted to the platform layer to produce a particular playback speed. For example, when slowing down playback by repeating frames, the component 150 may submit the same frame twice to the platform layer with a different time stamp each time that represents where in a storyboard of video frames each frame belongs. For reversed video (e.g., rewind), the system may reverse the media timeline for playback. In other words, although the platform timeline will appear to advance forward, the timeline conversion component 150 will select frames for submitting to the platform in the reverse of their normal order, so that the media timeline is being advanced backwards.

When video is displayed at a sufficiently high speed, the client may have more frames than are necessary for playing back a suitable quality level at the increased speed. The human eye typically perceives smooth video playback at a rate of 30 frames per second (fps) or higher. If a video presentation is already playing at 30 fps, then when played at 2x speed it plays at 60 fps. In such situations, the system 100 can reduce the number of frames played, and thus requested from the server by half to save bandwidth and other resources. Accordingly, the system may skip some video chunks or modify requests to the server to avoid requesting excess data. Alternatively or additionally, the system 100 may be able to play higher quality video at slower playback speeds. For example, if the bandwidth between client and server is constrained, then standard playback may be using a 300 kbps stream. When the user requests half-speed playback, the system may be able to utilize the extra available bandwidth to request chunks for a 600 kbps version of the content. This allows the user to see higher quality video when possible.

The timeline conversion component 150 also manages timelines for associated audio content. For example, a video stream may have an accompanying audio stream that provides a complete audiovisual presentation. The timeline conversion component 150 may provide appropriate conversions for audio data to match those provided for video data. For example, the component 150 may speed up and/or pitch correct audio using platform APIs for audio data modification. When audio cannot be matched to a particular video playback speed, then the component 150 may substitute a silent audio stream (e.g., by placing silent audio packets in a playback queue) or mute the audio hardware, if possible.

The modified request component 160 requests a reduced set of frames related to the smooth streaming media from a server providing the media. Normal smooth streaming requests use URLs like the following: http://foo.com/bar.ism/fragments(video=1000s), where foo.com is the server, bar.ism is a reference to the manifest describing a particular smooth streaming presentation, "/fragments" indicates a request for a multimedia presentation in chunks, and "video=1000s" specifies an absolute time position within a presentation associated with a particular chunk. Chunks may include I-frames, B-frames, P-frames, and other common frame encoding types and techniques. When playing video at faster than normal speeds, the system 100 may operate more efficiently by eliminating some frames (e.g., frames that are not key frames or I-frames). Thus, the server may support a request that replaces "/fragments" with "/keyframes" or another suitable modification and the response provides a smaller chunk based on a reduced set of frames (e.g., one that eliminates P- and B-frames). The modified request component 160 issues the appropriate type of request for the current playback speed.

The platform interface component 170 provides an interface to an underlying platform for playing smooth streaming media. In some embodiments, the multispeed playback system operates as an intermediate layer for abstracting common functionality between a client application that uses smooth streaming media and a platform for playing back media. The platform may include an operating system, computer hardware, a runtime component, an application sandbox, and other available underlying functionality. The platform interface component 170 accesses available platform functionality to playback media using client hardware, store media information, log statistics, and so forth. In some embodiments, the system 100 uses the MICROSOFT™ SILVERLIGHT™ platform, which can operate within a web browser or as a standalone application to playback media.

The computing device on which the multispeed playback system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
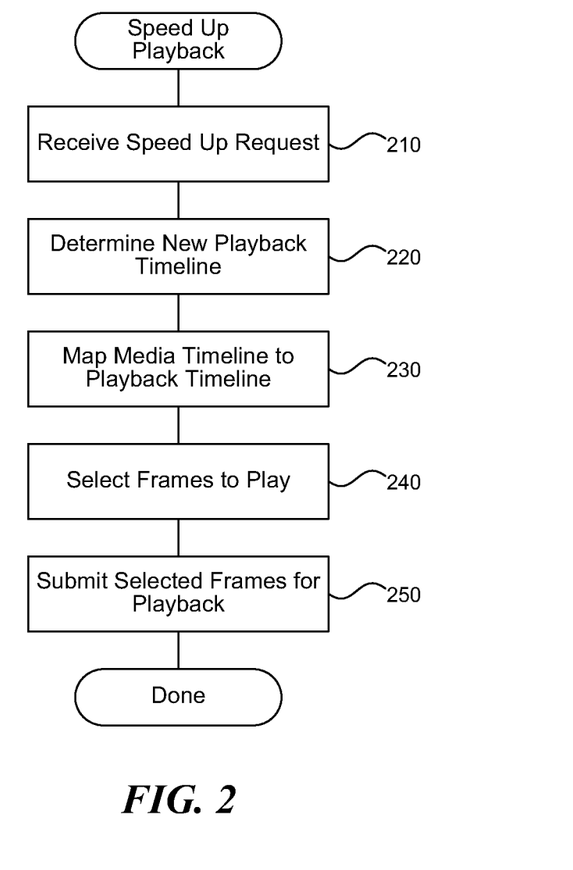
FIG. 2 is a flow diagram that illustrates processing of the multispeed playback system to speed up media playback, in one embodiment.

FIG. 2 is a flow diagram that illustrates processing of the multispeed playback system to speed up media playback, in one embodiment. Beginning in block 210, the system receives a request to speed up playback speed of smooth streaming media. For example, a user may press a fast forward button or select a faster speed, or a client application may programmatically request to increase the speed. Continuing in block 220, the system determines a playback timeline for one or more portions associated with the smooth streaming media to create an appearance of faster playing media. For example, the portions may be frames of video or smooth streaming chunks, and the system determines how to submit the portions to the platform layer to simulate faster playback. For example, the system may drop every other frame and place a timestamp on the remaining frame that is as close together as a previous rate of playback (e.g., a frame every 33 ms).

Continuing in block 230, the system maps a media timeline associated with the smooth streaming media to the determined playback timeline. For example, the system may determine that an original timescale of the media needs to be shrunk to create faster playback. The system may also determine that enough frames are available to more sparsely request frames from a server with similar user perceivable playback quality on the client. For example, the system may start requesting only I-frames from the server. Continuing in block 240, the system selects frames from the smooth streaming media to play. For example, the system may keep all of the frames (in case the user later requests standard playback), but mark certain frames to ignore for the current playback speed. If the user requests a 2x playback speed, then the system may ignore every other frame.

Continuing in block 250, the system submits the selected frames to a platform for decoding and playing back media.

For example, the system may provide the frames to a buffer associated with a playback API. After block 250, these steps conclude.

Figure 3:
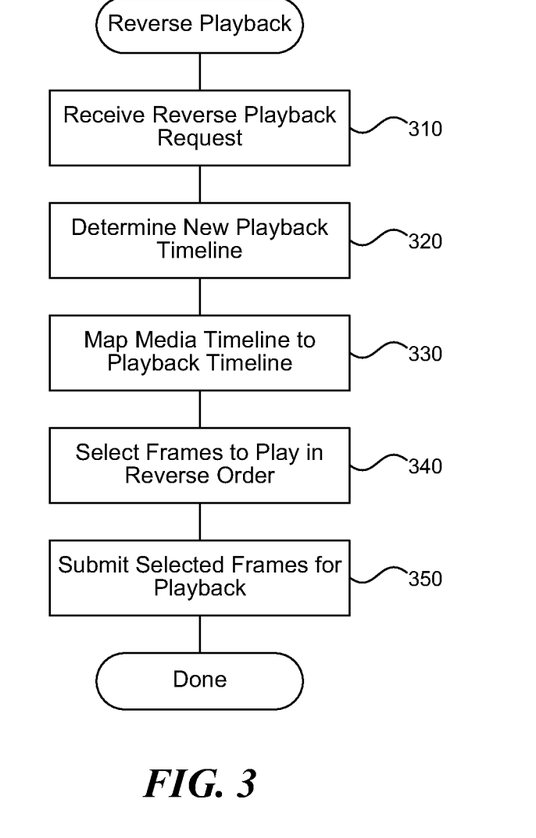
FIG. 3 is a flow diagram that illustrates processing of the multispeed playback to reverse media playback, in one embodiment.

FIG. 3 is a flow diagram that illustrates processing of the multispeed playback to reverse media playback, in one embodiment. Beginning in block 310, the system receives a request to reverse playback of a media item. For example, the user may request to rewind a live streaming media presentation. The request may include a playback speed, such as 2×, 4×, and so forth.

Continuing in block 320, the system determines a playback timeline for one or more available fragments of the media item that will produce a simulation of reversed playback using the one or more available fragments. For example, if the request indicates 1× reversed content, then the system may determine that each of the fragments used for forward play will also be used for reversed play, only in reverse order. For faster than normal playback, the system may determine that there are excess frames available such that some can be dropped or not played. For slower than normal play, the system may determine that there are not enough frames available and that some will be repeated (e.g., played twice back-to-back) to fill the gaps.

Continuing in block 330, the system maps a timeline associated with the media item to the determined playback timeline to select an order and timing for each available fragment. For example, for 2× reverse play, the system may determine that every other frame in the media timeline will be inserted into the playback timeline in reverse order from a current point. Playing the frames in this manner will appear to the user like rewinding the video at a 2× speed. To the underlying platform, the platform is still just playing normal video that moves forward according to the platform's timeline.

Continuing in block 340, the system selects one or more frames to play in reverse order from the available fragments. As noted in the previous example, the system may determine that playing every other frame will produce an acceptable user experience (e.g., 20 to 30 fps video) for the selected speed of play. For reverse play, frames are typically already available locally on the client if the user has first watched the video in the forward direction. Accordingly, the system may not need to request any frames from the server if the frames are available in a client cache or other data store. When the user resumes forward play, the system can resume requesting fragments from the server or may continue receiving and buffering fragments even while reverse play continues.

Continuing in block 350, the system submits the selected frames to a platform layer for decoding and playback. Each frame may include an associated timestamp that tells the platform layer when to play each frame. By setting the timestamps appropriately, the system can create the requested rate of playback and can place the available frames in an order that satisfies the requested behavior. After block 350, these steps conclude.

Figure 4:
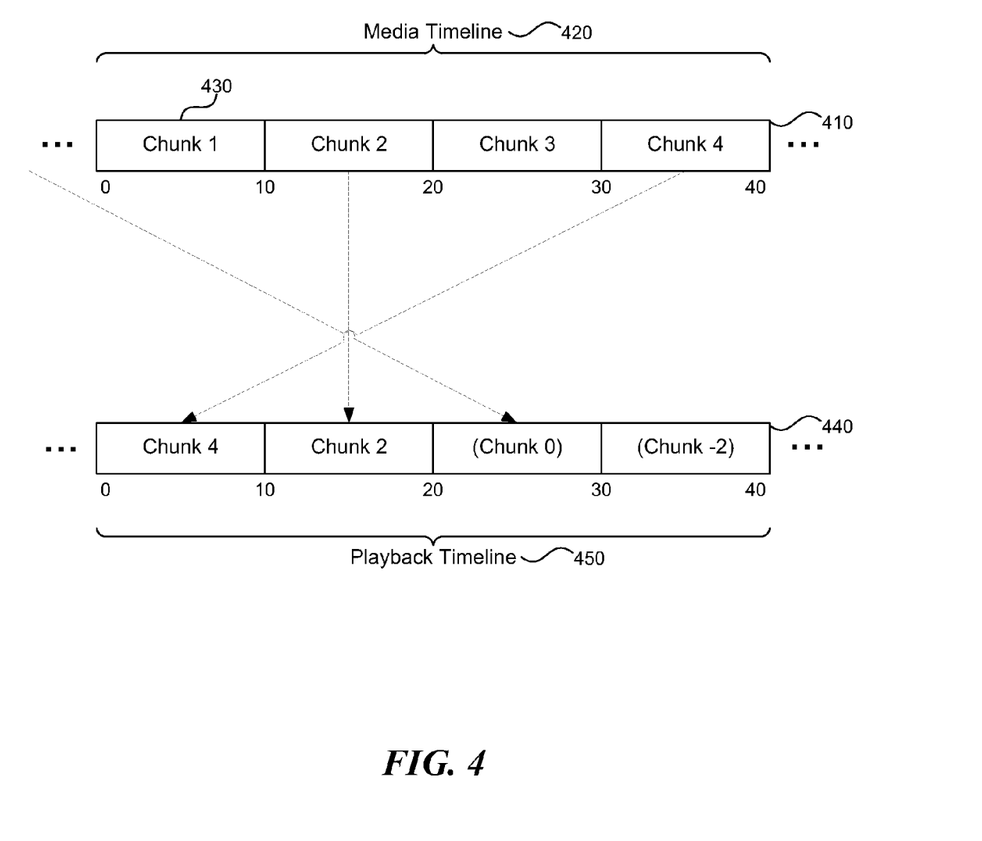
FIG. 4 is a block diagram that illustrates a mapping of chunks from a media timeline to a playback timeline, in one embodiment.

FIG. 4 is a block diagram that illustrates a mapping of chunks from a media timeline to a playback timeline, in one embodiment. In the illustrated example, the user has selected 2× reverse playback (e.g., rewind at twice the normal speed). Reverse playback may not be provided by the underlying platform (e.g., MICROSOFT™ SILVERLIGHT™), such that the system has to provide it by allowing the underlying platform timeline to move forward while in fact the media timeline is moving in reverse. The system ensures that timeline markers and other features continue to work while the timeline conversion is going on. The media received from the server includes chunks 410 that follow an original media timeline 420, typically the relative time at which the original event was recorded/captured. The media timeline 420 includes one or more chunks 430 designed to be played in order to reconstitute a streaming media event. Normally, the chunks 410 are played on the client one after the other according to a timestamp or other indication provided with each chunk 430. The platform includes a buffer 440 into which the system places chunks (although chunks are shown here, the system may also place individual frames) for playback. The platform plays the chunks in the order they are provided and according to a timestamp with which each frame is associated. When the user requests a modified playback speed, the playback timeline 450 diverges from the media timeline 420 to produce the requested effect. For example, in the case of 2× reverse playback, the buffer 440 shown includes every other frame in reverse order from the original media timeline. When the platform plays these frames in this order, it will appear to the user that the video has been reversed (e.g., rewind is occurring).

In some embodiments, the multispeed playback system provides automatic transitions between multispeed playback and normal playback. For example, if a user joined a live event late and fast forwards, the playback will eventually catch up to the current position of the live event. When that happens, the system automatically transitions from fast forward back to normal playback speed. As another example, the system may only allow viewing a fixed window or a presentation (e.g., the last hour). If a user rewinds, the user will eventually be viewing the start of the window, and the system may transition back to normal speed forward play when that occurs.

In some embodiments, the multispeed playback system provides scrubbing when the user seeks within a video. Scrubbing refers to the display of video as the user seeks, such as a quick snapshot of a particular point in time of the video. As the video drags a cursor to seek along a video timeline, the system can show images that provide a preview of the video content at the current seek position. This helps the user seek to a particular point in the video that the user might be trying to find.

In some embodiments, the multispeed playback system modifies heuristics based on the current playback speed. Heuristics are statistics and performance information tracked by the system that are used for various decisions, such as selecting an appropriate bitrate encoding for a currently available amount of bandwidth. When the user plays video at slower than normal speed, it has the effect making any client side buffer appear bigger in time. For example, a buffer that can hold 15 seconds of video at 1× playback can hold 30 seconds of video at ½× playback. Thus, the system may determine based on heuristics that a higher bitrate stream for the video can be downloaded during slower speed playback, or that a lower bitrate stream should be used during faster speed playback.

In some embodiments, the multispeed playback system maintains video markers inserted by content producers. Markers refer to identifications of any position within a content stream that a producer wants to label for particular behavior. Markers are similar to a bookmark. Markers may denote points in a presentation where a producer wants the client to display an advertisement, for example. When modifying the playback speed, markers are not in the same location on the playback timeline as they were in the original media timeline. The multispeed playback system converts the markers to the current playback timeline so that the producer's intention in placing the marker is still respected during non-standard playback. Thus, if a user rewinds to the point of a marker the system still performs behavior identified by the marker, such as displaying an advertisement. In some embodiments, marker behavior during non-standard play is configurable, so that a producer can specify that advertisements be shown for forward play but not reverse play, for example.

In some embodiments, the multispeed playback system serves requests from a local cache for multispeed playback. For example, if a user has watched a video forward and then rewinds, then the frames to display in the rewind playback may be available in a local client cache. In addition, if a user has already watched a video in normal speed and the user watches it again in fast forward at a rate that the system decides to only display certain frames, then the system may be able to extract those frames from the cache even though they may have originally arrived in larger chunks (e.g., as a full GOP with multiple frames). This approach saves server bandwidth and provides lower latency at the client since the frame request does not wait for the network.

From the foregoing, it will be appreciated that specific embodiments of the multispeed playback system have been described herein for purposes of illustration, but that various modifications may be made without deviating from the spirit and scope of the invention. Accordingly, the invention is not limited except as by the appended claims.

We claim:

1. A computer-implemented method for modifying an apparent playback speed of streaming media at a client computing device, the method comprising:
    receiving, by the client computing device, a request to modify the apparent playback speed of the streaming media;
    determining a playback timeline for one or more portions of the streaming media based upon the requested modified apparent playback speed, wherein a playback timescale of the playback timeline represents playback of the streaming media at the requested modified apparent playback speed;
    mapping, by the client computing device, frame positions of the one or more portions of the streaming media to frame positions of the determined playback timeline based upon the requested modified apparent playback speed and such that the mapped frame positions of the determined playback timeline represent playback of the one or more portions of the streaming media at the requested modified playback speed, the mapping comprising modifying one or more timeline markers that indicate positions within the one or more portions of the streaming media at which additional content is to be inserted;
    selecting, by the client computing device, frames of the one or more portions of the streaming media based upon the mapped frame positions of the determined playback timeline;
    sending requests, by the client computing device, for subsets of frames of the one or more portions of the streaming media from a server computing device at a rate based on a selected playback quality for the requested modified apparent playback speed, one or more of the sent requests including an indication of one or more frames within the subset of frames being requested by that particular request; and
    submitting the selected frames to a platform layer for playback, wherein the preceding steps are performed by at least one processor.

2. The method of claim 1 wherein receiving the request comprises receiving an indication that a user requested the requested modified apparent playback speed through a user interface control.

3. The method of claim 1 wherein receiving the request comprises receiving a programmatic request from a client application to modify the apparent playback speed.

4. The method of claim 1 wherein the platform layer is a fixed speed platform layer operable to play frames at a forward 1× speed.

5. The method of claim 1, further comprising:
    modifying a time-stamp of at least one selected frame according to the mapped frame positions of the determined playback timeline.

6. The method of claim 1 wherein mapping frame positions of the one or more portions of the streaming media to frame positions of the determined playback timeline further comprises determining a timescale compression factor based upon the requested modified apparent playback.

7. The method of claim 1 wherein selecting frames comprises dropping at least one frame if the requested modified playback speed is faster than 1×.

8. The method of claim 1 wherein submitting the selected frames to the platform layer comprises submitting at least one frame to the platform layer multiple times if the requested modified apparent playback speed is slower than 1×.

9. A client-side computer system for controlling the play back of streaming media at an apparent playback speed and/or direction, the system comprising:
    a memory and a processor that are respectively configured to store and execute software instructions, including instructions that are organized into:
        a speed selection component configured to receive requests to play back the streaming media at an apparent playback speed and/or direction, wherein the apparent playback speed and/or direction is different than forward 1× playback;
        a timeline conversion component configured to map frames of the streaming media to positions of a platform timeline based upon the apparent playback speed and/or direction by modifying one or more timeline markers that indicate positions within the streaming media at which additional content is to be inserted, and to select a subset of the frames of the streaming media for submission to a platform application;
        a modified request component configured to transmit a request to pull a non-contiguous subset of frames of the streaming media from a server computing device in response to receiving a request to play the streaming media at a playback speed that is faster than 1×, the request including an indication of the subset of frames; and
        a platform application interface component configured to provide an interface to the platform application and to submit the selected subset of the frames to the platform application, wherein the platform application is configured to receive the submitted frames and to play back the streaming media at a rate that is constant with respect to the frames received by the platform application.

10. The system of claim 9 wherein the speed selection component is further configured to display a user interface and receive a user selection of one or more controls for modifying the apparent playback speed and/or direction.

11. The system of claim 9 wherein the speed selection component is further configured invoke the timeline conversion component to modify the platform timeline to create an effect expected for the apparent playback speed and/or direction.

12. The system of claim 9 wherein the timeline conversion component is further configured to drop frames of the streaming media for faster than 1× playback.

13. The system of claim 9 wherein the timeline conversion component is further configured to map a single frame of the streaming media to multiple positions of the platform timeline for slower than 1× playback.

14. The system of claim 9 wherein the timeline conversion component is further configured to map frames of the streaming media to positions of the platform timeline in a reversed order if the apparent playback direction is reverse.

15. The system of claim 9 wherein the timeline conversion component is further configured to modify one or more frame timestamps to instruct the platform application to play each frame at a particular time, wherein the particular time is related to the apparent playback speed and/or direction.

16. A computer memory having instructions stored therein for controlling a computer system to change a playback direction of streaming media, wherein the instructions, upon execution, cause a processor to perform actions comprising:
    receiving a request to change a playback direction of a streaming media item;
    determining a playback timeline for one or more fragments of the streaming media item that will produce a simulation of reversed playback using the one or more fragments;
    mapping frames of the one or more fragments of the streaming media to frame positions of the determined playback timeline in a reverse order such that the mapped frame positions of the determined playback timeline represent reverse playback of the one or more fragments of the streaming media, the mapping further comprising modifying one or more timeline markers that indicate positions within the one or more fragments of the streaming media at which additional content is to be inserted;
    sending, by the client computing device, a request to pull a subset of the frames of the streaming media item from a server computing device, the request to pull the subset of frames including an indication of the frames being requested; and
    submitting the frames of the one or more fragments of the streaming media to a platform layer based upon the mapped frame positions of the determined playback timeline.

17. The computer memory of claim 16, wherein the platform layer is a fixed speed platform layer operable to play frames at a forward 1× speed.

18. The computer memory of claim 16, wherein the actions further comprise:
    displaying a user interface having one or more controls for modifying the playback direction, wherein the request to change the playback direction of the streaming media item is received via the user interface.

19. The computer memory of claim 16, wherein individual frames of the submitted frames include time stamps that indicate, to the platform layer, when that individual frame is to be played by the platform layer.

20. The computer memory of claim 19, wherein the actions further comprises: displaying a snapshot of a particular point in one or more fragments of the streaming media as a user seeks within the streaming media to provide a preview of associated content at a current seek position.

* * * * *